(12) United States Patent
Kamichi et al.

(10) Patent No.: US 7,885,749 B2
(45) Date of Patent: Feb. 8, 2011

(54) DRIVE SYSTEM, POWER OUTPUT SYSTEM INCORPORATING THE DRIVE SYSTEM, A VEHICLE EQUIPPED WITH THE POWER OUTPUT SYSTEM, AND CONTROL METHOD FOR A DRIVE SYSTEM

(75) Inventors: Kensuke Kamichi, Aichi-gun (JP); Kiyoshiro Ueoka, Nisshin (JP); Masaya Yamamoto, Kasugai (JP); Kazuomi Okasaka, Nagoya (JP); Yoichi Tajima, Anjo (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 1009 days.

(21) Appl. No.: 11/587,381

(22) PCT Filed: Feb. 23, 2006

(86) PCT No.: PCT/IB2006/000373

§ 371 (c)(1),
(2), (4) Date: Oct. 24, 2006

(87) PCT Pub. No.: WO2006/090249

PCT Pub. Date: Aug. 31, 2006

(65) Prior Publication Data

US 2008/0033620 A1 Feb. 7, 2008

(30) Foreign Application Priority Data

Feb. 24, 2005 (JP) ............................. 2005-049501

(51) Int. Cl.
*G06F 7/00* (2006.01)
*G06F 17/00* (2006.01)

(52) U.S. Cl. .................... 701/59; 701/68; 477/70; 477/174; 477/180

(58) Field of Classification Search .................. 701/59, 701/68
See application file for complete search history.

(56) References Cited

U.S. PATENT DOCUMENTS 5,241,477 A * 8/1993 Narita ........................ 701/59

(Continued)

FOREIGN PATENT DOCUMENTS

| JP | A 2002-225578 | 8/2002 |
|---|---|---|
| JP | 2004-204959 | 7/2004 |

OTHER PUBLICATIONS

Office Action issued in JP Application No. 2005-049501 on Aug. 21, 2007 (with partial English translation).

*Primary Examiner*—Khoi Tran
*Assistant Examiner*—Brian J Broadhead
(74) *Attorney, Agent, or Firm*—Oliff & Berridge, PLC

(57) ABSTRACT

In a drive system, where power from a motor is transmitted to a drive shaft and a transmission ratio is changed by a transmission, if the absolute value of the difference between the reference torque Tm2r0, which is the drive shaft side torque Tm2r at the onset of a change in the shift speed of the transmission, and the driving shaft side torque Tm2r during the change is less than the threshold value α until the end of the change (S280), the application state of a brake in the transmission during the change and the state of the hydraulic pressure supplied to the brake are learned (S290). During the change, and actuator of the transmission is controlled using those learned results. Accordingly, any deviations that may have occurred due to changes over time in the transmission, etc. are corrected and the shift speed of the transmission is changed more appropriately.

11 Claims, 10 Drawing Sheets

U.S. PATENT DOCUMENTS

| | | | |
|---|---|---|---|
| 5,551,930 A * | 9/1996 | Creger et al. | 477/130 |
| 5,588,937 A * | 12/1996 | Kono et al. | 477/169 |
| 5,812,957 A | 9/1998 | Iizuka | |
| 6,077,190 A | 6/2000 | Tabata et al. | |
| 6,510,371 B1 * | 1/2003 | Lee | 701/64 |
| 6,577,940 B2 * | 6/2003 | Saito et al. | 701/59 |
| 7,440,833 B2 * | 10/2008 | Chen | 701/51 |
| 7,641,031 B2 * | 1/2010 | Nakamura et al. | 192/3.31 |
| 2002/0062188 A1 | 5/2002 | Rosi et al. | |
| 2004/0064232 A1 * | 4/2004 | Eich et al. | 701/68 |
| 2005/0181909 A1 * | 8/2005 | Oshiumi et al. | 477/156 |
| 2008/0033620 A1 * | 2/2008 | Kamichi et al. | 701/59 |

\* cited by examiner

DRIVE SYSTEM, POWER OUTPUT SYSTEM INCORPORATING THE DRIVE SYSTEM, A VEHICLE EQUIPPED WITH THE POWER OUTPUT SYSTEM, AND CONTROL METHOD FOR A DRIVE SYSTEM

FIELD OF THE INVENTION

The invention relates to a drive system and a power output system that incorporates the drive system, a vehicle equipped with the power output system, and a method for controlling such drive system.

BACKGROUND OF THE INVENTION

Japanese Patent Application Publication No. JP-A-2002-225578 describes a drive system incorporated in a vehicle where power is output from a motor to a drive shaft, which is connected to an axle, via a transmission. The system makes the power from the motor appropriate for the vehicle speed by changing the shift speed of the transmission in accordance with the vehicle speed, and then outputs that power to the drive shaft.

With this kind of drive system, in order to correct any deviations that may have occurred due to changes over time in the transmission and more appropriately change the transmission ratio of the transmission, it is desirable to perform a learning operation and control an actuator of the transmission using the learned results when the transmission ratio of the transmission is changed. In this case, it is desirable to perform the learning operation when the shift speed of the transmission is changed while the drive system is operating steadily. However, it is difficult to determine whether the drive system is operating steadily using the torque that is output from the motor, for example, when the shift speed of the transmission is changed while maintaining power output from the motor, because the torque that is output from the motor changes when the shift speed changes. Furthermore, in a power output device that outputs both power from an engine and power from a motor via a transmission to a drive shaft, it is difficult to determine whether it is operating steadily using torque that is output from the motor because the torque changes in response to a change in the power from the motor when the ratio between the power from the engine and the power from the motor is changed, even when it is operating steadily.

SUMMARY OF THE INVENTION

Thus, one object of a drive system, a power output system that incorporates the drive system, a vehicle equipped with the power output system, and a method for controlling such drive system according to the invention is to more appropriately change the transmission ratio of a transmission. Another object is to more appropriately determine whether to perform a learning operation for learning an operational state of an actuator and an operational state of the motor.

The drive system, the power output system that incorporates the drive system, the vehicle equipped with the power output system, and the method for controlling such drive system according to the invention all employ the following means to achieve at least part of the foregoing objects.

A drive system according to the invention drives a drive shaft and includes: a motor that outputs power; shifting/transmitting means for transmitting power from a rotating shaft of the motor to the drive shaft, and changing a transmission ratio between the rotating shaft of the motor and the drive shaft by driving an actuator; shift learning means for performing a learning operation to learn at least one of an operational state of the actuator and an operational state of the motor, when the transmission ratio of the shifting/transmitting means is changed such that an amount of change in driving force on the drive shaft side, that is output to the drive shaft from the motor via the shifting/transmitting means, is within a predetermined range; and shift control means for controlling the actuator of the shifting/transmitting means using the results of the learning operation such that the transmission ratio of the shifting/transmitting means changes.

With the drive system according to the invention, at least one of the operational state of the actuator and the operational state of the motor is learned, when the transmission ratio of the shifting/transmitting means is changed such that the amount of change in the driving force on the drive shaft side, that is output to the drive shaft from the motor via the shifting/transmitting means, is within the predetermined range. Also, the actuator of the shifting/transmitting means is controlled using the results of the learning operation such that the transmission ratio of the shifting/transmitting means changes. Because at least one of the operational state of the actuator and the operational state of the motor is learned when the transmission ratio of the shifting/transmitting means is changed such that the amount of change in the driving force on the drive shaft side is the predetermined range, and the actuator is controlled using those results of the learning operation, it is possible to more appropriately determine whether the learning operation can be performed. In addition, it is possible to correct any deviations that may have occurred due to changes over time in the transmission, and more appropriately change the transmission ratio of the shifting/transmitting means. As a result, the learning operation can be performed more appropriately.

In the drive system according to the invention, the shift learning means may also be configured to estimate the driving force on the drive shaft side based on driving of the motor, and perform the learning operation when the transmission ratio of the shifting/transmitting means is changed such that the amount of change in the estimated driving force on the drive shaft side is within the predetermined range. In this case, the shift learning means may also be configured to estimate the driving force on the drive shaft side using one of a current value applied to the motor and a torque command value of the motor. As a result, the driving force on the drive shaft side can be more accurately estimated.

Also, in the drive system according to the invention, the shift learning means may be configured to perform the learning operation when the difference between the driving force on the drive shaft side at the onset of the change in the transmission ratio of the shifting/transmitting means and the driving force on the drive shaft side during the change in the transmission ratio of the shifting/transmitting means is less than a predetermined difference until the change in the transmission ratio of the shifting/transmitting means ends. As a result, it is possible to more appropriately determine whether the learning operation can be performed.

Furthermore, in the drive system according to the invention, the shifting/transmitting means may be configured to change the transmission ratio by changing the application state of at least one hydraulically driven clutch, and the shift learning means may be configured to learn the application state of the clutch of the shifting/transmitting means and the state of hydraulic pressure supplied to the clutch throughout the duration of the change in the transmission ratio of the shifting/transmitting means. As a result, it is possible to correct changes over time in the application state of the clutch and the state of the hydraulic pressure supplied to that clutch, and more appropriately change the transmission ratio of the shifting/transmitting means. In this case, the term "clutch" includes not only a normal clutch which connects two rotating systems, but also includes, for example, a brake that holds one rotating system to a non-rotating system.

In the drive system according to the invention, the shift learning means may also be configured to learn a change state of the rotation speed of the motor throughout the duration of the change in the transmission ratio of the shifting/transmitting means. As a result, the learning operation for learning the change state of the rotation speed of the motor enables the transmission ratio of the shifting/transmitting means to be changed more appropriately.

A power output system according to the invention includes: the drive system according to the invention of any of the modes described above; power means for outputting power to the drive shaft; required power setting means for setting a required power that is required for the drive shaft; and control means for controlling the motor and the power means such that the required power set by the required power setting means is output to the drive shaft based on the transmission ratio of the shifting/transmitting means.

Because the power output system according to the invention incorporates the drive system according to the invention of any of the modes described above, the power output system is also capable of more appropriately determining whether the learning operation can be performed. Also, the power output system is capable of correcting any deviations that may have occurred due to changes over time in the transmission, and more appropriately changing the transmission ratio of the shifting/transmitting means. In addition, power based on the required power can be output to the drive shaft.

In the power output system according to the invention, the power means may also be configured to include an internal combustion engine, and electric power/power input/output means that is connected to an output shaft of the internal combustion engine and the drive shaft and outputs at least some of the power from the internal combustion engine to the drive shaft with the input/output of electric power and power.

A vehicle according to the invention is equipped with the power output system according to the invention of any of the modes described above, wherein an axle is connected to the drive shaft. Because such a vehicle is equipped with the power output system according to the invention of any of the modes described above, in the vehicle, it is also possible to more appropriately determine whether the learning operation can be performed. It is also possible to correct any deviations that may have occurred due to changes over time in the transmission, and more appropriately change the transmission ratio of the shifting/transmitting means.

A method for controlling a drive system according to the invention is a method for controlling a drive system that includes a motor that outputs power; and shifting/transmitting means for transmitting power from a rotating shaft of the motor and a drive shaft, and changing a transmission ratio between the rotating shaft of the motor and the drive shaft by driving an actuator. The method includes (a) performing a learning operation to learn at least one of an operational state of the actuator and an operational state of the motor, when the transmission ratio of the shifting/transmitting means is changed such that an amount of change in driving force on the drive shaft side, that is output to the drive shaft from the motor via the shifting/transmitting means, is within a predetermined range, and (b) controlling the actuator of the shifting/transmitting means using the results of the learning operation such that the transmission ratio of the shifting/transmitting means changes.

According to the method for controlling a drive system according to the invention, at least one of the operational state of the actuator and the operational state of the motor is learned, when the transmission ratio of the shifting/transmitting means is changed such that the amount of change in driving force on the drive shaft side, that is output to the drive shaft from the motor via the shifting/transmitting means, is within a predetermined range, and the actuator of the shifting/transmitting means is controlled using the results of the learning operation such that the transmission ratio of the shifting/transmitting means changes. Because at least one of the operational state of the actuator and the operational state of the motor is learned when the transmission ratio of the shifting/transmitting means is changed such that the amount of change in the driving force on the drive shaft side is within the predetermined range, and the actuator is controlled using the results of the learning operation, it is possible to more appropriately determine whether it is possible to perform a learning operation. It is also possible to correct any deviations that may have occurred due to changes over time in the transmission, and more appropriately change the transmission ratio of the shifting/transmitting means. As a result, more appropriate learning operation can be performed.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE EXAMPLE EMBODIMENTS

Next, example embodiments of the invention will be described.

Figure 1:
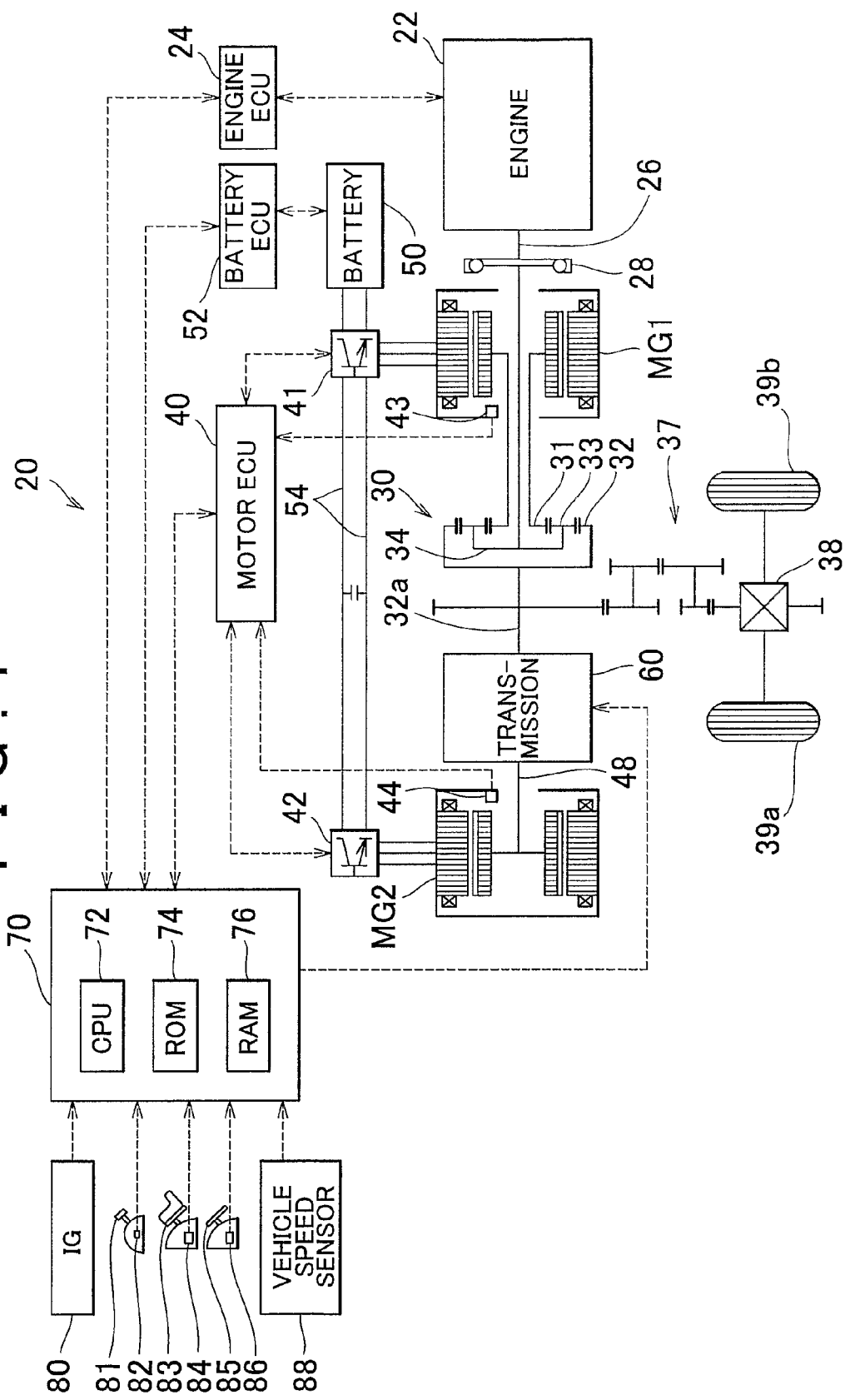
FIG. 1 is the block diagram schematically showing the configuration of a hybrid vehicle 20 equipped with a drive system as one example embodiment of the invention.

FIG. 1 is the block diagram schematically showing the configuration of a hybrid vehicle 20 equipped with a power output system as one example embodiment of the invention. As shown in the drawing, the hybrid vehicle 20 includes an engine 22, a three-shaft type power split/integration mechanism 30 that is connected via a damper 28 to a crankshaft 26 that serves as an output shaft of the engine 22, a motor MG1 that generates power and that is connected to the power split/integration mechanism 30, a motor MG2 that is connected to the power split/integration mechanism 30 via a transmission 60, and a hybrid electronic control unit (hereinafter, referred to as a "hybrid ECU") 70 that controls the overall vehicle.

The engine 22 is an internal combustion engine that outputs power by burning a hydrocarbon fuel such as gasoline or light oil. An engine electronic control unit (hereinafter simply referred to as "engine ECU") 24, which receives signals from various sensors that detect the operational state of the engine 22, performs operation control of the engine 22, such as fuel injection control, ignition control, intake air quantity regulation control and the like. The engine ECU 24 communicates with the hybrid ECU 70, and performs operation control of the engine 22 in response to control signals from the hybrid ECU 70. When necessary, the engine ECU 24 also outputs data related to the operational state of the engine 22 to the hybrid ECU 70.

The power split/integration mechanism 30 is configured as a planetary gear set that includes a sun gear 31 with external teeth, a ring gear 32 with internal teeth that is concentric with the sun gear 31, a plurality of pinion gears 33 that mesh with both the sun gear 31 and the ring gear 32, and a carrier 34 that rotatably and revolvably supports the plurality of pinion gears 33. The planetary gear set performs a differential operation with the sun gear 31, the ring gear 32, and the carrier 34 as rotating elements. The power split/integration mechanism 30 is configured such that the crankshaft 26 of the engine 22 is connected to the carrier 34, the motor MG1 is connected to the sun gear 31, and the transmission 60 is connected via a ring gear shaft 32a to the ring gear 32. When the motor MG1 functions as a generator, the power split/integration mechanism 30 divides the power from the engine 22, input from the carrier 34, between the sun gear 31 side and the ring gear 32 side according to that gear ratio. When the motor MG1 functions as a motor, the power split/integration mechanism 30 combines the power from the engine 22, input from the carrier 34, with the power from the motor MG1, input from the sun gear 31, and outputs the combined power to the ring gear 32 side. The power output to the ring gear 32 is then output from the ring gear shaft 32a to drive wheels 39a and 39b via a gearing system 37 and a differential gear 38.

The motor MG1 and the motor MG2 are both configured as synchronous generator motors which can be driven both as generators and motors. The motors MG1 and MG2 receive power from and supply power to a battery 50 via inverters 41 and 42. Power lines 54 that connect the inverters 41 and 42 to the battery 50 include a positive bus and a negative bus that are shared by both the inverters 41 and 42, and power generated by either one of the motors MG1 or MG2 can be consumed by the other motor. Therefore, the battery 50 is charged and discharged according to whether there is a surplus or shortage of power generated by the motors MG1 and MG2. Incidentally, if the input and output of power to and from the motors MG1 and MG2 were always balanced, the battery 50 would neither be charged nor discharged. The motors MG1 and MG2 are both controlled by a motor electronic control unit (hereinafter simply referred to as "motor ECU") 40. The motor ECU 40 receives signals necessary for driving the motors MG1 and MG2. The signals include, for example, signals from rotational position detecting sensors 43 and 44 that detect the rotational positions of rotors of the motors MG1 and MG2, and signals indicating phase currents applied to the motors MG1 and MG2 that are detected by a current sensor, not shown. The motor ECU 40 then outputs switching control signals to the inverters 41 and 42. The motor ECU 40 calculates the rotation speeds Nm1 and Nm2 of the rotors of the motors MG1 and MG2 according to a rotation speed calculating routine, not shown, based on the signals received from the rotational position detecting sensors 43 and 44. The motor ECU 40 communicates with the hybrid ECU 70 and drives the motors MG1 and MG2 in response to control signals from the hybrid ECU 70. In addition, when necessary, the ECU 40 outputs data related to the operational states of the motors MG1 and MG2 to the hybrid ECU 70.

Figure 2:
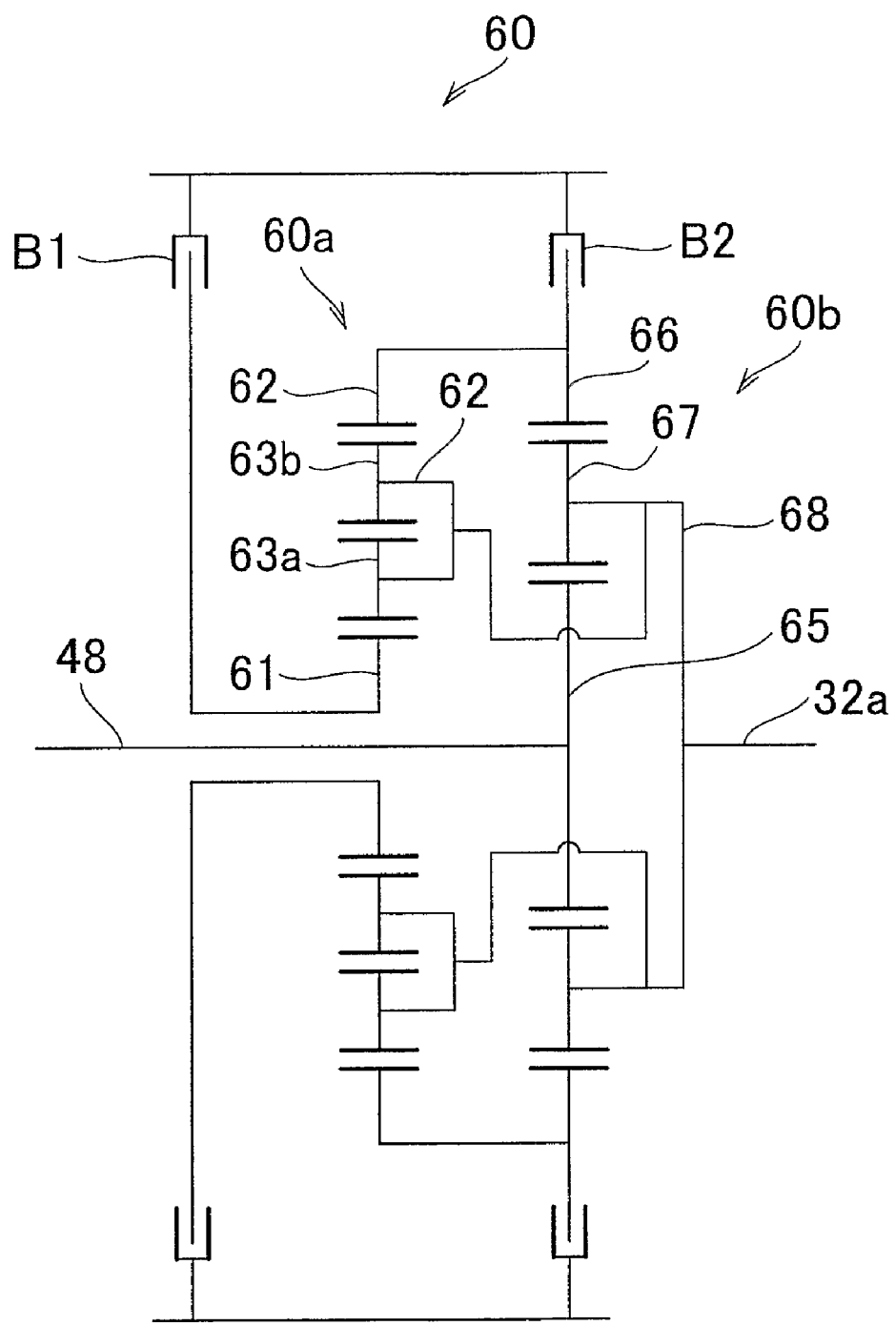
FIG. 2 is the block diagram schematically showing the configuration of a transmission 60.

The transmission 60 is configured to selectively connect and disconnect a rotating shaft 48 of the motor MG2 to and from the ring gear shaft 32a, as well as slow the rotation speed of the rotating shaft 48 of the motor MG2 into one of two speeds and transmit the slowed rotation speed to the ring gear shaft 32a when those shafts are connected. One example configuration of the transmission 60 is shown in FIG. 2. The transmission 60 shown in FIG. 2 includes a double pinion planetary gear set 60a, a single pinion planetary gear set 60b, and two brakes B1 and B2. The double pinion planetary gear set 60a includes a sun gear 61 with external teeth, a ring gear 62 with internal teeth that is concentric with respect to the sun gear 61, a plurality of first pinion gears 63a that are in mesh with the sun gear 61, a plurality of second pinion gears 63b that are in mesh with both the first pinion gears 63a and the ring gear 62, and a carrier 64 which connects, as well as rotatably and revolvably supports, the plurality of first pinion gears 63a and the plurality of second pinion gears 63b. The sun gear 61 can be held stationary by applying the brake B1 or allowed to rotate by releasing the brake B1. The single pinion planetary gear set 60b includes a sun gear 65 with external teeth, a ring gear 66 with internal teeth that is arranged concentrically with the sun gear 65, a plurality of pinion gears 67 that are in mesh with both the sun gear 65 and the ring gear 66, and a carrier 68 that rotatably and revolvably supports the plurality of pinion gears 67. The sun gear 65 is connected to the rotating shaft 48 of the motor MG2 and the carrier 68 is connected to the ring gear shaft 32a. The ring gear 66 can be held stationary by applying the brake B2 or allowed to rotate by releasing the brake B2. The double pinion planetary gear set 60a and the single pinion planetary gear set 60b are connected to each other via the ring gear 62 and the ring gear 66, and the carrier 64 and the carrier 68. In the transmission 60, the rotating shaft 48 of the motor MG2 can be disconnected from the ring gear shaft 32a by releasing both the brakes B1 and B2. When the brake B1 is released and the brake B2 is applied, rotation of the rotating shaft 48 of the motor MG2 is slowed by a relatively large reduction gear ratio and transmitted to the ring gear shaft 32a (hereinafter, this state will be referred to as "Low gear state"). On the other hand, when the brake B1 is applied and the brake B2 is released, rotation of the rotating shaft 48 of the motor MG2 is slowed by a relatively small reduction gear ratio and transmitted to the ring gear shaft 32a (hereinafter, this state will be referred to as "High gear state"). When the brakes B1 and B2 are both applied, the rotation shaft 48 and the ring gear shaft 32a are prevented from rotating.

Figure 3:
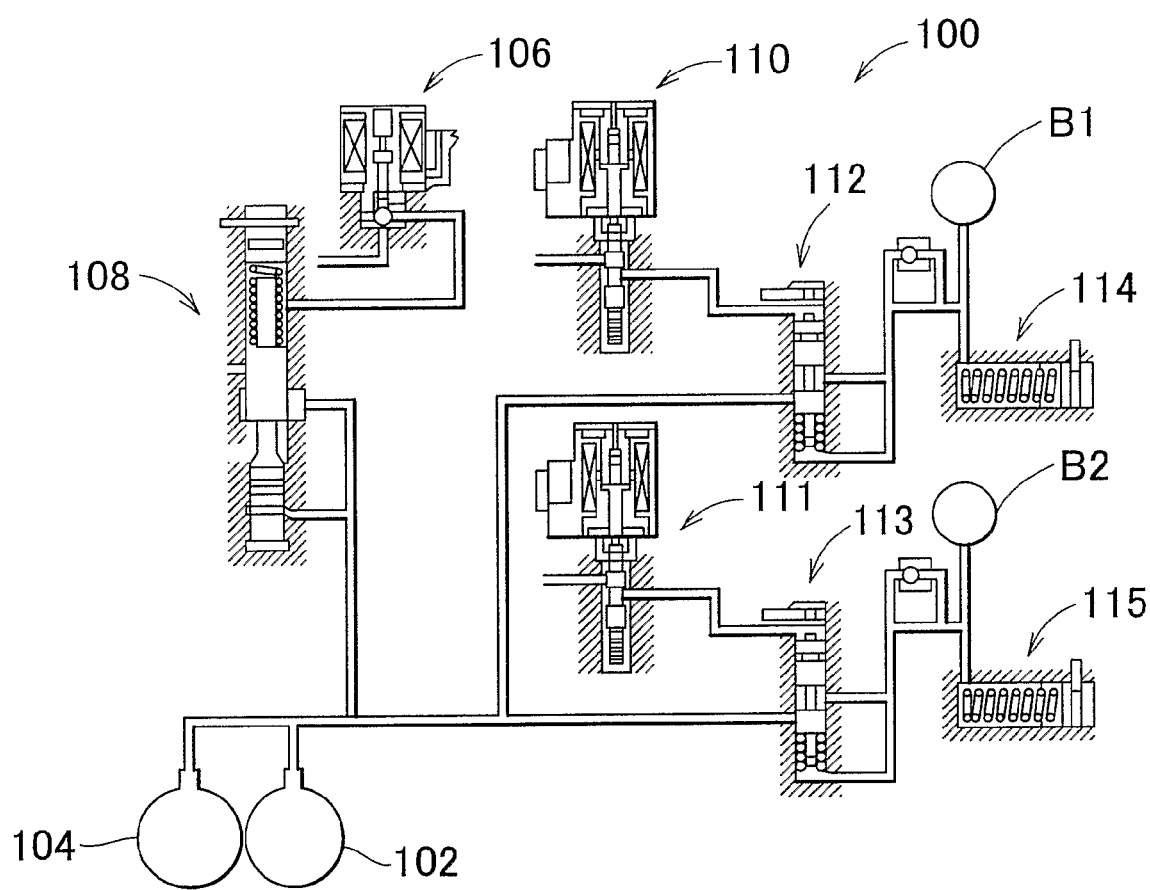
FIG. 3 is the block diagram schematically showing the configuration of a hydraulic pressure circuit 100.

The brakes B1 and B2 are applied and released in response to hydraulic pressure from a hydraulic pressure circuit 100 illustrated in FIG. 3. As shown in the drawing, the hydraulic pressure circuit 100 includes a mechanical pump 102 that is driven by the rotation of the engine 22, an electric pump 104 that houses an electric motor, not shown, a three-way solenoid 106 and a pressure control valve 108 that regulate the line hydraulic pressure PL from the mechanical pump 102 or the electric pump 104, linear solenoids 110 and 111 and control valves 112 and 113 which regulate the application force of the brakes B1 and B2 using the line hydraulic pressure PL, and accumulators 114 and 115. In the hydraulic pressure circuit 100, the line hydraulic pressure PL is regulated by driving the three-way solenoid 106 to open or close the pressure control valve 108. The application force of the brakes B1 and B2 is adjusted by controlling the control valves 112 and 113, which transmit the line hydraulic pressure PL to the brakes B1 and B2, to open or close by controlling the current applied to the linear solenoids 110 and 111.

The battery 50 is controlled by a battery electronic control unit (hereinafter, simply referred to as "battery ECU") 52. The battery ECU 52 receives signals necessary to control the battery 50, such as signals indicating the voltage between terminals from a voltage sensor, not shown, provided between the terminals of the battery 50, signals indicating the charge and discharge current from a current sensor, not shown, attached to the power line 54 that is connected to the output terminal of the battery 50, and signals indicating the battery temperature Tb from a temperature sensor, not shown, attached to the battery 50, and the like. The battery ECU 52 then outputs data related to the state of the battery 50 to the hybrid ECU 70 when necessary. The battery ECU 52 also calculates the state-of-charge (SOC) based on the cumulative value of the charge and discharge current detected by the current sensor in order to control the battery 50.

The hybrid ECU 70 is a microprocessor that is centered around a CPU 72. In addition to the CPU 72, the hybrid ECU 70 also has ROM 74 which stores processing programs, RAM 76 which temporarily stores data, and an input/output port and a communication port, both of which are not shown. The hybrid ECU 70 receives various signals via the input port. Some examples of these signals received by the hybrid ECU 70 include an ignition signal from an ignition switch 80, a signal indicating a shift lever position SP from a shift lever position sensor 82 which detects the operating position of a shift lever 81, a signal indicating an accelerator opening amount Acc from an accelerator pedal position sensor 84 which detects the accelerator opening amount Acc corresponding to the depression amount of an accelerator pedal 83, a signal indicating a brake pedal position BP from a brake pedal position sensor 86 which detects the depression amount of a brake pedal 85, and a signal indicating a vehicle speed V from a vehicle speed sensor 88. The hybrid ECU 70 also outputs various signals via the output port, such as a drive signal to the electric motor that drives the electric pump 104, a drive signal to the three-way solenoid 106, and drive signals to the linear solenoids 110 and 111. As described above, the hybrid ECU 70 communicates with the engine ECU 24, the motor ECU 40, and the battery ECU 52 via the communication port, and sends and receives various control signals and data to and from the engine ECU 24, the motor ECU 40, and the battery ECU 52.

In the hybrid vehicle 20 in the example embodiment, which is configured as described above, a required torque to be output to the ring gear shaft 32a, which serves as the drive shaft, is calculated based on the vehicle speed V and the accelerator opening amount Acc corresponding to the amount that the accelerator pedal 83 is depressed by a driver. The engine 22, the motor MG1, and the motor MG2 are then operated so that the required power, which corresponds to the required torque, is output to the ring gear shaft 32a. There are various operating modes according to which the engine 22, the motor MG1, and the motor MG2 are operated. For example, there is a torque conversion operating mode which operates the engine 22 so that power matching the required power is output from the engine 22, and drives the motors MG1 and MG2 so that all the power output from the engine 22 is torque-converted by the power split/integration mechanism 30 and the motors MG1 and MG2, and output to the ring gear shaft 32a. There is also a charge-discharge operating mode which operates the engine 22 so that power matching the sum of the required power and the electric power needed to either charge the battery 50 or be discharged from the battery 50 is output from the engine 22. In the charge-discharge operating mode, the motor MG1 and the motor MG2 are driven so that the required power is output to the ring gear shaft 32a as all or some of the power that is output from the engine 22 when the battery 50 is charged or discharged is torque-converted by the power split/integration mechanism 30 and the motors MG1 and MG2. There is also a motor operating mode which stops the operation of the engine 22 and outputs power that matches the required power from the motor MG2 to the ring gear shaft 32a.

Figure 4:
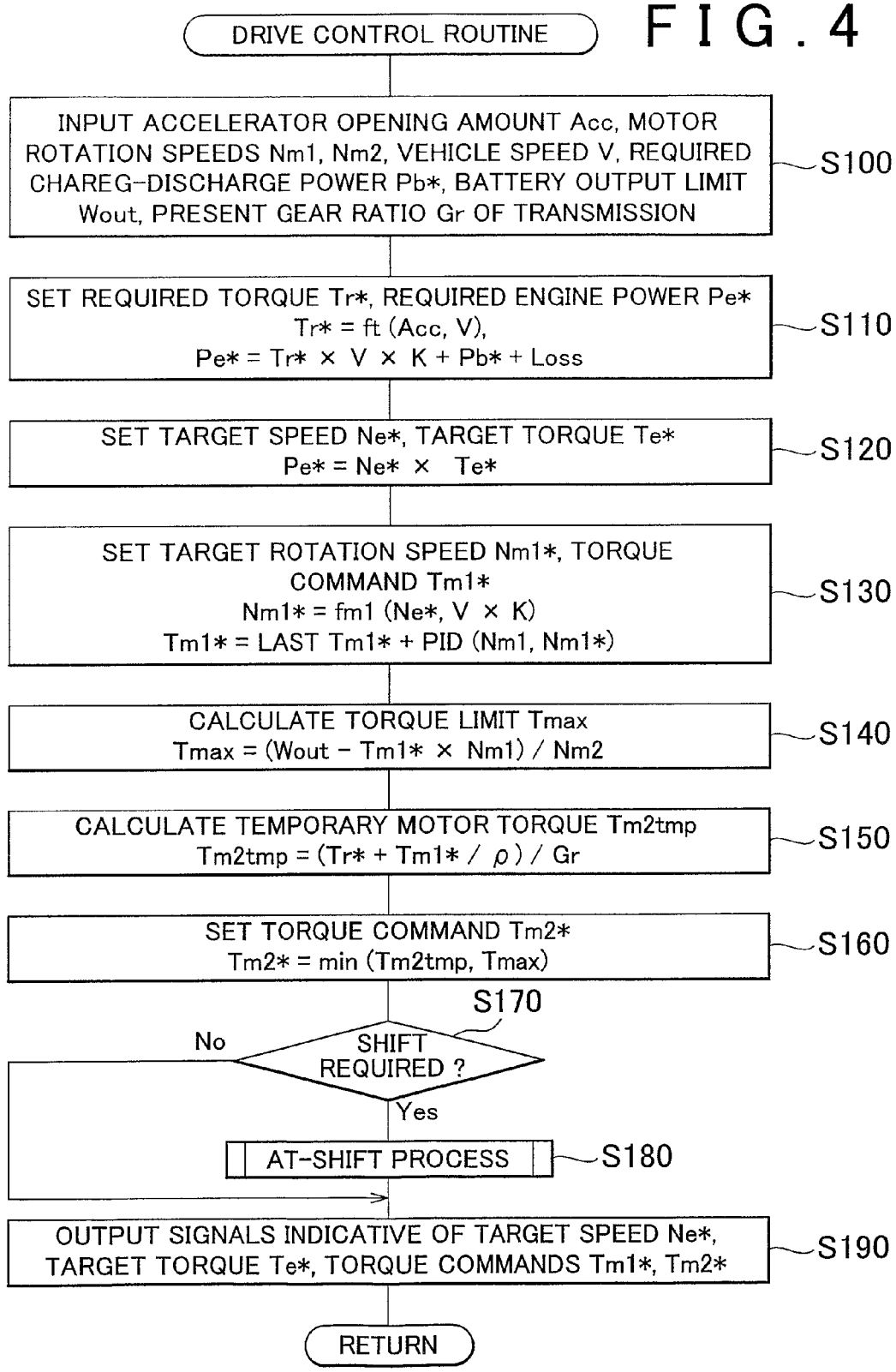
FIG. 4 is the flowchart illustrating one example of the drive control routine executed by a hybrid electronic control unit 70.

Next, operation of the hybrid vehicle 20 of the foregoing configuration will be described. FIG. 4 is a flowchart showing an example of a drive control routine executed by the hybrid ECU 70. This routine is executed at predetermined intervals of time (for example, every few milliseconds).

When the drive control routine is executed, the CPU 72 of the hybrid ECU 70 first inputs data such as the accelerator opening amount Acc from the accelerator pedal position sensor 84, the vehicle speed V from the vehicle speed sensor 88, the rotation speeds Nm1 and Nm2 of the motors MG1 and MG2, the required charge-discharge power Pb* that the battery 50 is to charge or discharge, an output limit Wout of the battery 50, and a present gear ratio Gr of the transmission 60 (step S100). Here, the values of the rotation speeds Nm1 and Nm2 of the motors MG1 and MG2 are calculated based on the rotational position of the rotors of the motors MG1 and MG2 detected by the rotational position detecting sensors 43 and 44, and input from the motor ECU 40. The value of the required charge-discharge power Pb* is set based on the state-of-charge (SOC) of the battery 50 and the like, and is input from the battery ECU 52. Moreover, the value of the output limit Wout is set based on the temperature Th of the battery 50 and the state-of-charge (SOC) of the battery 50, and is input from the battery ECU 52. The present gear ratio Gr of the transmission 60 is obtained by dividing the rotation speed Nm2 of the motor MG2 by the rotation speed Nr of the ring gear shaft 32a which serves as the drive shaft. In this case, the rotation speed Nr of the ring shaft 32a can be obtained by multiplying the vehicle speed V by a conversion factor k.

Figure 5:
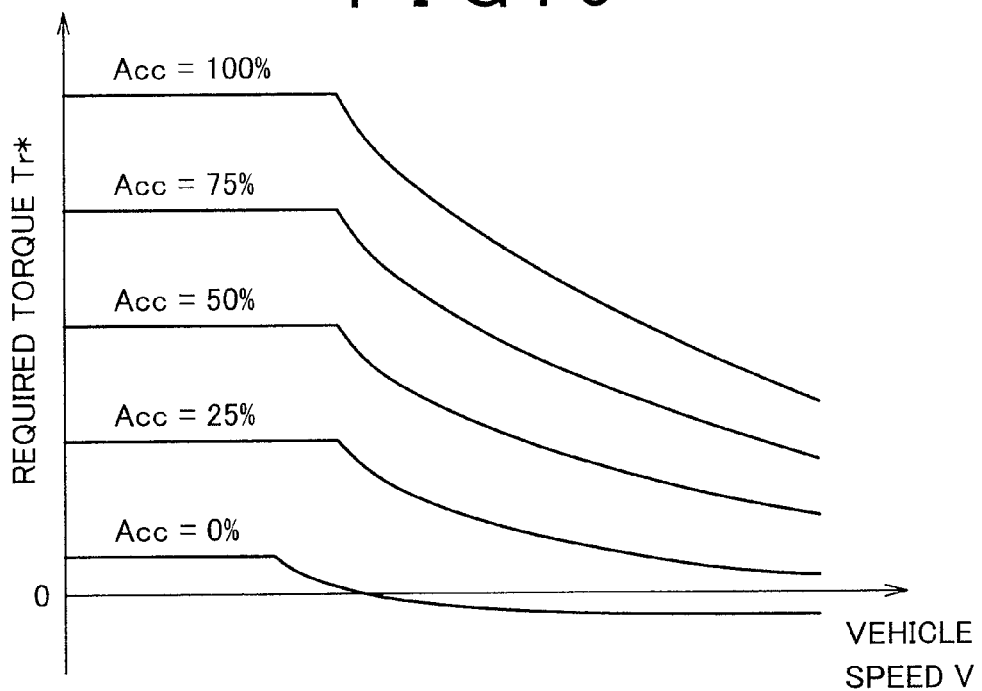
FIG. 5 is the view illustrating one example of the required torque setting map.

When the data is input in this manner, the required torque Tr* to be output to the ring gear shaft 32a and the required power Pe* that is required of the engine 22 are then set based on the accelerator opening amount Acc and the vehicle speed V that were input (step S110). In the example embodiment, the required torque Tr* is stored in the ROM 74 as a required torque setting map with the relationship between the accelerator opening amount Acc, the vehicle speed V, and the required torque Tr* set beforehand. Once the accelerator opening amount Acc and the vehicle speed V are provided, the corresponding required torque Tr* is derived from the stored map and set. An example of the required torque setting map is shown in FIG. 5. The required power Pe* is set according to the sum of the product of the rotation speed Nr of the ring gear shaft 32a multiplied by the required torque Tr*, the required charge-discharge power Pb* that the battery 50 is to charge or discharge, and a loss Loss.

Figure 6:
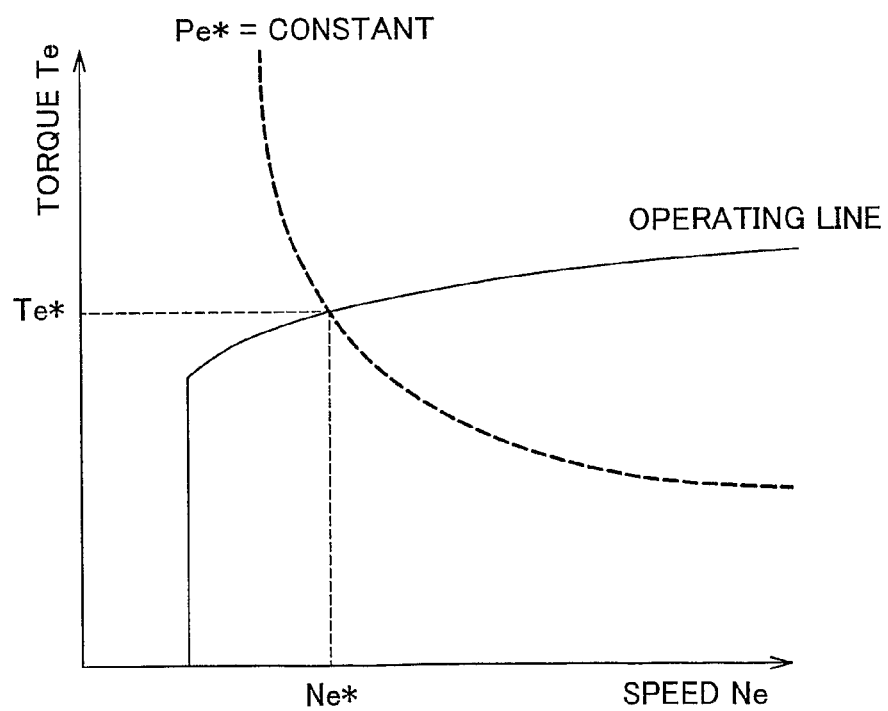
FIG. 6 is the view illustrating the manner in which the target torque Te* and the target speed Ne* and one example of an operating line of an engine 22 are set.

Continuing on, a target torque Te* and a target speed Ne* of the engine 22 are then set based on the required power Pe* (step S120). This is done by setting the target speed Ne* and the target torque Te* based on the required power Pe* and an operating line that operates the engine 22 efficiently. The manner in which the target speed Ne*, the target torque Te*, and one example of the operating line of the engine 22 are set is shown in FIG. 6. As shown in the drawing, the target speed Ne* and the target torque Te* can be obtained according to the point at which the operating line and the curve of the required power Pe*, which is constant, (Ne*×Te*) intersect.

Figure 7:
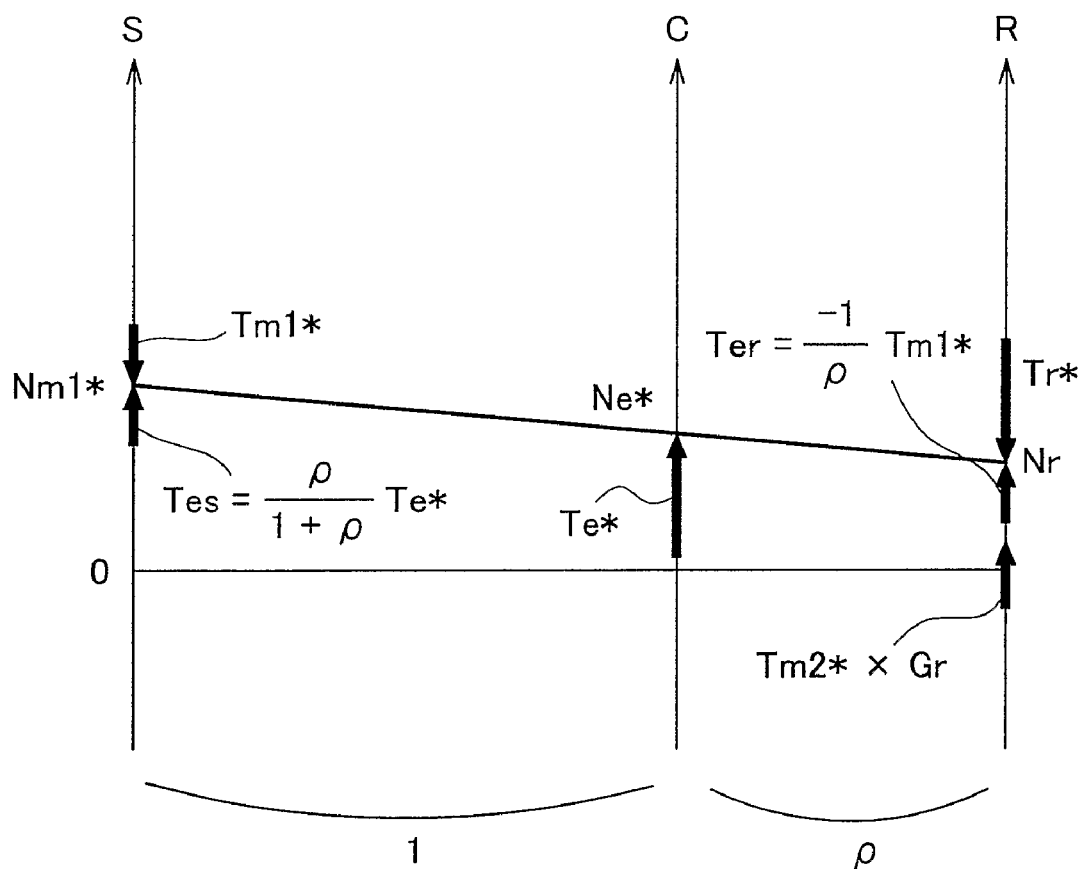
FIG. 7 is the view showing one example of the alignment graph for mechanically illustrating rotating elements of a power split/integration mechanism 30.

When the target speed Ne* and the target torque Te* are set, both a target rotation speed Nm1* and a torque command value Tm1* of the motor MG1 are calculated (step S130). The target rotation speed Nm1* is calculated according to Expression (1), shown below, using the set target speed Ne*, the rotation speed Nr (=V×k) of the ring gear shaft 32a, and the gear ratio p of the power split/integration mechanism 30. The torque command Tm1* of the motor MG1 is calculated according to Expression (2), shown below, based on the calculated target rotation speed Nm1* and the present rotation speed Nm1. Here, Expression (1) is a mechanical relational expression with respect to the rotating elements of the power split/integration mechanism 30. An alignment graph showing the mechanical relationship between the torque and the rotation speed of the rotating elements of the power split/integration mechanism 30 is shown in FIG. 7. In the drawing, axis S on the left represents the rotation speed of the sun gear 31, i.e., the rotation speed Nm1 of the motor MG1; axis C represents the rotation speed of the carrier 34, i.e., the speed Ne of the engine 22; and axis R represents the rotation speed Nr of the ring gear 32 (i.e., the ring gear shaft 32a). The target rotation speed Nm1* of the motor MG1 can easily be derived using the relationships of the rotation speeds in the alignment graph. Therefore, the engine 22 can be operated at the target speed Ne* by setting the torque command Tm1* so that the motor MG1 rotates at the target rotation speed Nm1*, and driving the motor MG1. Expression (2) is a relational expression of feedback control for rotating the motor MG1 at the target rotation speed Nm1*. In Expression (2), the term "k1" is proportional gain and the term "k2" is integral gain. The two bold arrows pointing upward on axis R in FIG. 7 both represent torque obtained when the engine 22 is operated at the operating point of the target speed Ne* and the target torque Te*. One of the arrows represents the torque obtained when the torque Te* output from the engine 22 is directly transmitted to the ring gear shaft 32a (hereinafter referred to as "directly transmitted torque Ter"). The other arrow represents the torque obtained when the torque Tm2* output from the motor MG2 acts on the ring gear shaft 32a via the transmission 60.

$$Nm1^* = Ne^* \times (1+\rho)/\rho - V \times k/\rho \quad (1)$$

$$Tm1^* = \text{Last } Tm1^* + k1(Nm1^* - Nm1) + k2\int (Nm1^* - Nm1) \, dt \quad (2)$$

When the torque command Tm1* and the target rotation speed Nm1* of the motor MG1 are calculated, a maximum torque limit Tmax that may be output from the motor MG2, is calculated (step S140) according to Expression (3) below. In the Expression (3), the difference between the output limit Wout of the battery 50 and the power consumption (generated power) of the motor MG1, which is obtained by multiplying the present rotation speed Nm1 of the motor MG1 by the torque command Tm1* of the motor MG1, is divided by the rotation speed Nm2 of the motor MG2. In addition, a torque to be output from the motor MG2 (hereinafter, referred to as a "temporary motor torque Tm2 tmp"), is calculated (step S150) according to Expression (4) using the required torque Tr*, the torque command Tm1*, the gear ratio ρ of the power split/integration mechanism 30, and the present gear ratio Gr of the transmission 60. The torque command Tm2* of the motor MG2 is set by limiting the calculated temporary motor torque Tm2tmp using the torque limit Tmax (step S160). By setting the torque command Tm2* of the motor MG2 in this way, the required torque Tr* to be output to the ring gear shaft 32a can be set as torque limited to within the range of the output limit Wout of the battery 50. Expression (4) can easily be derived from the alignment graph in FIG. 7 described above.

$$Tmax = (Wout - Tm1^* \times Nm1)/Nm2 \quad (3)$$

$$Tm2tmp = (Tr^* + Tm1^*/\rho)/Gr \quad (4)$$

Next, it is determined whether a change in the shift speed of the transmission 60 is required (step S170). Here, in the embodiment, a change in the shift speed of the transmission 60 is required at a preset timing based on the required torque Tr* and the vehicle speed V. If it is determined that no change in the shift speed of the transmission 60 is required, signals indicating the target speed Ne* and the target torque Te* of the engine 22 are sent to the engine ECU 24, while signals indicating the torque commands Tm1* and Tm2* of the motors MG1 and MG2 are sent to the motor ECU 40 (step S190), after which the drive control routine ends. Upon receiving the signals indicating the target speed Ne* and the target torque Te*, the engine ECU 24 performs various controls of the engine 22, such as fuel injection control and ignition control, so that the engine 22 operates at the operating point indicated by the target speed Ne* and target torque Te*. Also, upon receiving the signals indicating the torque commands Tm1* and Tm2*, the motor ECU 40 performs a switching control of the switching elements of the inverters 41 and 42 so that the motor MG1 is driven by the torque command Tm1* and the motor MG2 is driven by the torque command Tm2*.

Figure 8:
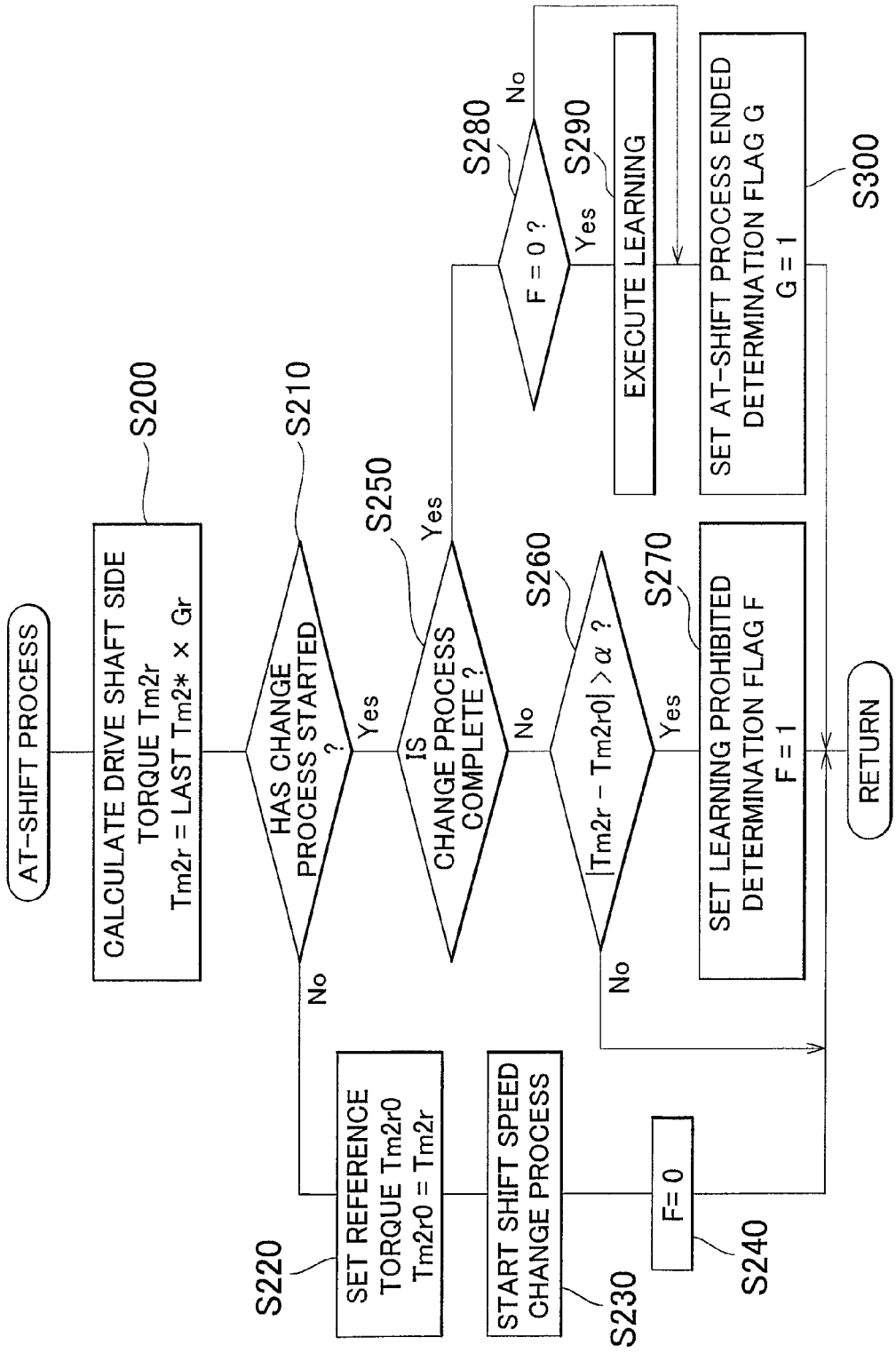
FIG. 8 is the flowchart illustrating one example of the at-shift process.
Figure 9:
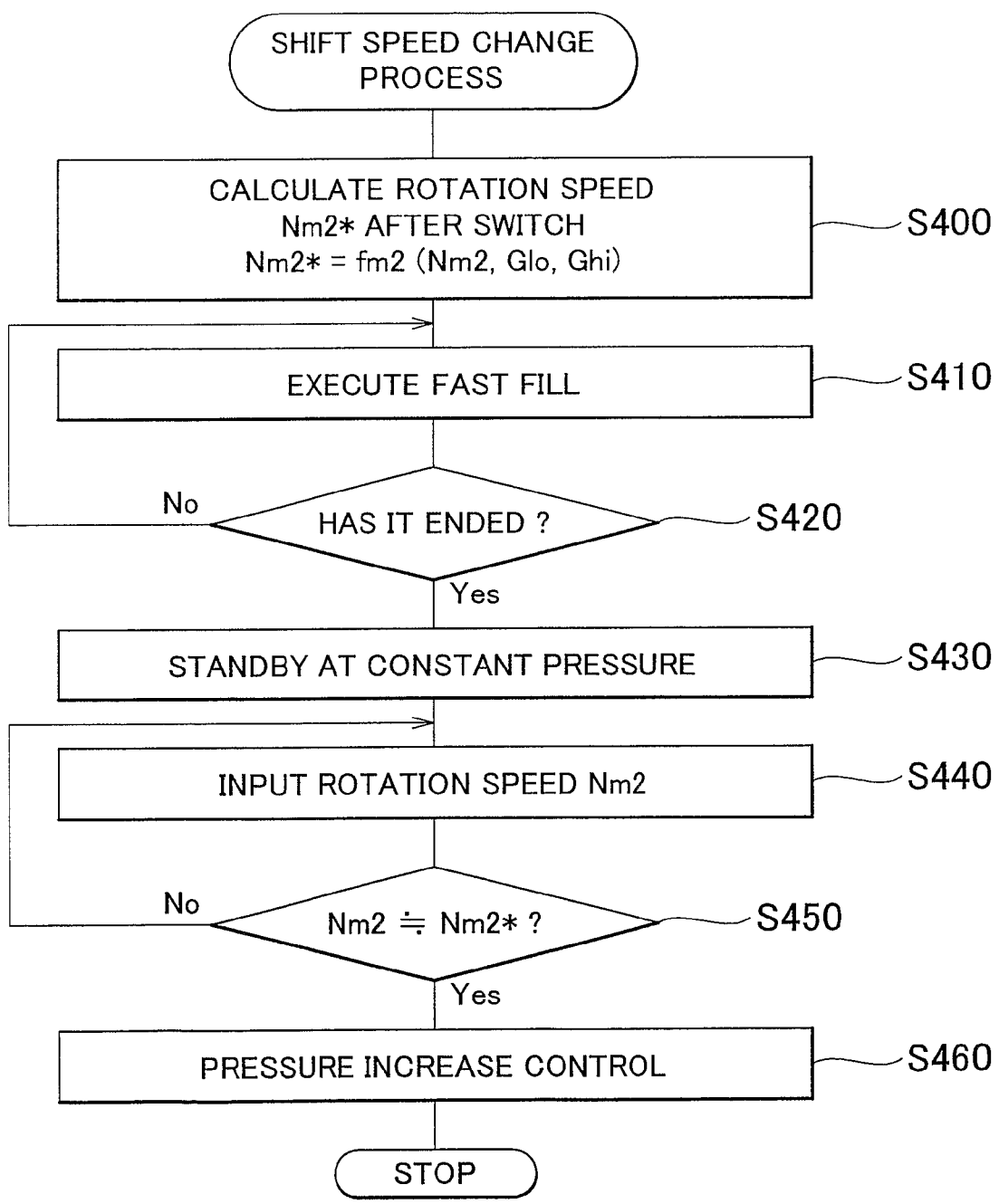
FIG. 9 is the flowchart illustrating one example of the shift speed change process.

If, on the other hand, it is determined in step S170 that a change in the shift speed of the transmission 60 is required, then an at-shift process shown in FIG. 8 is executed (step S1180) and signals indicating the target speed Ne* and the target torque Te* of the engine 22 and the torque commands Tm1* and Tm2* of the motors MG1 and MG2 are sent to the corresponding ECUs (step S190), after which the drive control routine ends. The at-shift process shown in FIG. 8, begins by calculating the torque on the drive shaft side to be output from the motor MG2 to the ring gear shaft 32a via the transmission 60 (hereinafter, referred to as the "drive shaft side torque Tm2r") (step S200). The drive shaft side torque Tm2 r is calculated by multiplying the present gear ratio Gr of the transmission 60 by the torque command (i.e., the last Tm2*) that was set when the drive control routine in FIG. 2 was last executed. Then, it is determined whether a shift speed change process, which changes the shift speed of the transmission 60, has started (step S210). If the shift speed change process has not yet started, the drive shaft side torque Tm2r is set as a reference torque Tm2r0 (step S220), the shift speed change process shown in FIG. 9 is started (step S230), and a learning prohibited determination flag F is set to 0 (step S240), after which the at-shift process ends. In this case, the learning prohibited determination flag F is a flag for determining whether to prohibit the learning operation for learning, for example, a change state of the rotation speed Nm2 of the motor MG2, a state of hydraulic pressure supplied to the brakes B1 and B2, and an application state of the brakes B1 and B2 when the shift speed of the transmission 60 changes. At this point, the description of the at-shift process shown in FIG. 8 will be temporarily interrupted in order to describe the shift speed change process shown in FIG. 9. The shift speed change process is executed by the hybrid ECU 70 while the drive control routine shown in FIG. 2 is performed.

In the shift speed change process, the CPU 72 of the hybrid ECU 70 first calculates the rotation speed Nm2* of the motor MG2 after the change according to Expression (5) below during an upshift in which the transmission 60 changes from Low gear state to High gear state, and according to Expression (6) below during a downshift in which the transmission 60 changes from High gear state to Low gear state, using the present rotation speed Nm2 of the motor MG2 and the gear ratio Glo or Ghi when the transmission 60 is in Low or High gear state, respectively (step S400). The CPU 72 then executes a "fast fill" (step S410). A "fast fill" in this case refers to a process of rapidly filling a pack with oil in order to close a gap between the friction members. More specifically, the process drives the linear solenoid 110 on the brake B1 side during an upshift and the linear solenoid 111 on the brake B2 side during a downshift at or around a duty ratio of 100%. An operation that drains the oil acting on the brake opposite the brake for which oil is being filled by the fast fill is also performed in conjunction with the fast fill operation. When the fast fill ends (step S420), the linear solenoids 110 and 111 are brought from a duty ratio at or around 100% to a low duty ratio and placed on standby at a constant pressure (step S430) until the rotation speed Nm2 of the motor MG2 approaches the rotation speed Nm2* after the change (steps S440 and S450). Then, the pressure increase control is performed (step S460) which regulates the duty ratio of the linear solenoids 110 and 111 by increasing the hydraulic pressure from the constant pressure during standby. The shift speed change process then ends.

$$Nm2^* = Nm2 \times Ghi/Glo \qquad (5)$$

$$Nm2^* = Nm2 \times Glo/Ghi \qquad (6)$$

Returning now to the at-shift process shown in FIG. 8, once it has been determined in step S210 that the shift speed change process has started, it is then determined whether the shift speed change process has finished (step S250). If it is determined that the shift speed change process is not yet complete, then the absolute value of the difference between the drive shaft side torque Tm2r, calculated in step S200, and the reference torque Tm2r0 is compared with a threshold value a (step S260). If the absolute value of the difference between the drive shaft side torque Tm2r and the reference torque Tm2r0 is less than the threshold value α, the at-shift process ends. If, on the other hand, the absolute value of the difference between the drive shaft side torque Tm2r and the reference torque Tm2r0 is equal to, or greater than, the threshold value α, the learning prohibited determination flag F is set to 1 (step S270) and the at-shift process ends. Then, when it is determined that the shift speed change process is complete (step S250), the value of the learning prohibited determination flag F is checked (step S280). If the value of the learning prohibited determination flag F is 0, i.e., if the absolute value of the difference between the drive shaft side torque Tm2r and the reference torque Tm2r0 throughout the duration of the change in the shift speed of the transmission 60 is equal to, or less than, the threshold value α, the learning operation is executed (step S290). If the value of the learning determination flag F is 1, then the learning operation is not executed and an at-shift process ended determination flag G, which indicates that the at-shift process has ended, is set to 1 (step S300) and the at-shift process ends. In this case, the learning operation at step S280 may include operations for learning, for example, the manner of filling the oil or increasing the hydraulic pressure on the brake side on which the oil is filled when a fast fill is performed in the shift speed change process in FIG. 9, the timing at which the oil or hydraulic pressure is drained or released on the brake side on which the oil is drained, the change state of the rotation speed Nm2 of the motor MG2 or the hydraulic pressure on each of the brake B1 and B2 sides when standing by at a constant pressure, and the application state of brakes B1 and B2 with respect to the hydraulic pressure acting on the each brake B1 and B2 side. Incidentally, making the determination as to whether the learning operation can be performed is difficult using the torque Tm2 output from the motor MG2, for example, when changing the shift speed while maintaining power output from the motor MG2, because the torque Tm2 output from the motor MG2 changes when the shift speed changes. In contrast, calculating the drive shaft side torque Tm2r based on the torque Tm2 output from the motor MG2 and the present gear ratio Gr of the transmission 60 and determining whether to perform the learning operation using the amount of change in the calculated drive shaft side torque Tm2r enables that determination to be made more accurately. Changing the shift speed of the transmission 60 according to the shift speed change process in FIG. 9 using the results learned in this manner enables any deviations which may have occurred due to changes over time in the application states of the brakes B1 and B2 and the state of the hydraulic pressure circuit 100 to be corrected, and changes in the shift speed of the transmission 60 can be made more appropriately taking into account the change state of the rotation speed Nm2 of the motor MG2. Then, if the amount of change in the drive shaft side torque Tm2r throughout the duration of the change in the shift speed of the transmission 60 is equal to, or less than, the threshold value α when the shift speed change process has ended, the learning operation can be performed more appropriately because the learning operation is performed in step S290 in the at-shift process in FIG. 8. If the at-shift process ended determination flag G is set to 1, it is determined in step S170 during a subsequent execution of the drive control routine in FIG. 2 that no change in the shift speed of the transmission 60 is required.

According to the hybrid vehicle 20 in the example embodiment described above, the determination as to whether to perform the learning operation can be made more appropriately because the learning operation for learning the change state of the rotation speed Nm2 of the motor MG2, the state of the hydraulic pressure supplied to the brakes B1 and B2, and the application state of the brakes B1 and B2 when changing the shift speed of the transmission 60 is performed when the absolute value of the difference between the drive shaft side torque Tm2r during the change in the shift speed of the transmission 60 and the reference torque Tm2r0, which is the drive shaft side torque Tm2r at the onset of the change in the shift speed of the transmission 60, is equal to, or less than, the threshold value α until the change in the shift speed of the transmission 60 ends. Also, the hydraulic pressure circuit 100 is driven using the results learned in this manner so any deviations that may have occurred due to changes over time in the state of the hydraulic pressure supplied to the brakes B1 and B2 and the application state of the brakes B1 and B2 can be corrected, and the shift speed of the transmission 60 can be changed more appropriately taking into account the change state of the rotation speed Nm2 of the motor MG2. As a result, the learning operation can be performed more appropriately.

In the hybrid vehicle 20 of the example embodiment, the drive shaft side torque Tm2r is calculated using the last torque command of the motor MG2 (i.e., the last Tm2*), i.e., using the Tm2 output from the motor MG2. However, the drive shaft side torque Tm2r may also be calculated using the present torque command Tm2* of the motor MG2. Alternatively, the drive shaft side torque Tm2r may also be calculated using the phase current applied to the motor MG2 instead of the torque command Tm2* of the motor MG2.

In the hybrid vehicle 20 of the example embodiment, the learning operation for learning the change state of the rotation speed Nm2 of the motor MG2, the state of the hydraulic pressure supplied to the brakes B1 and B2, and the application state of the brakes B1 and B2 is performed. However, the state of the hydraulic pressure supplied to the brakes B1 and B2 and the application state of the brakes B1 and B2 may also be learned individually or in various combinations.

In the hybrid vehicle 20 of the example embodiment, a hydraulic pressure circuit is used for the actuator of the brakes B1 and B2. However, actuators other than hydraulic actuators, such as actuators that use a motor or actuators that directly use a solenoid may also be used.

In the hybrid vehicle 20 of the example embodiment, a variable speed transmission 60 having two shift speeds, i.e., High speed and Low speed, is used. The transmission 60 is not limited to a transmission that has only two speeds, however. That is, a transmission having three or more speeds may also be used.

Figure 10:
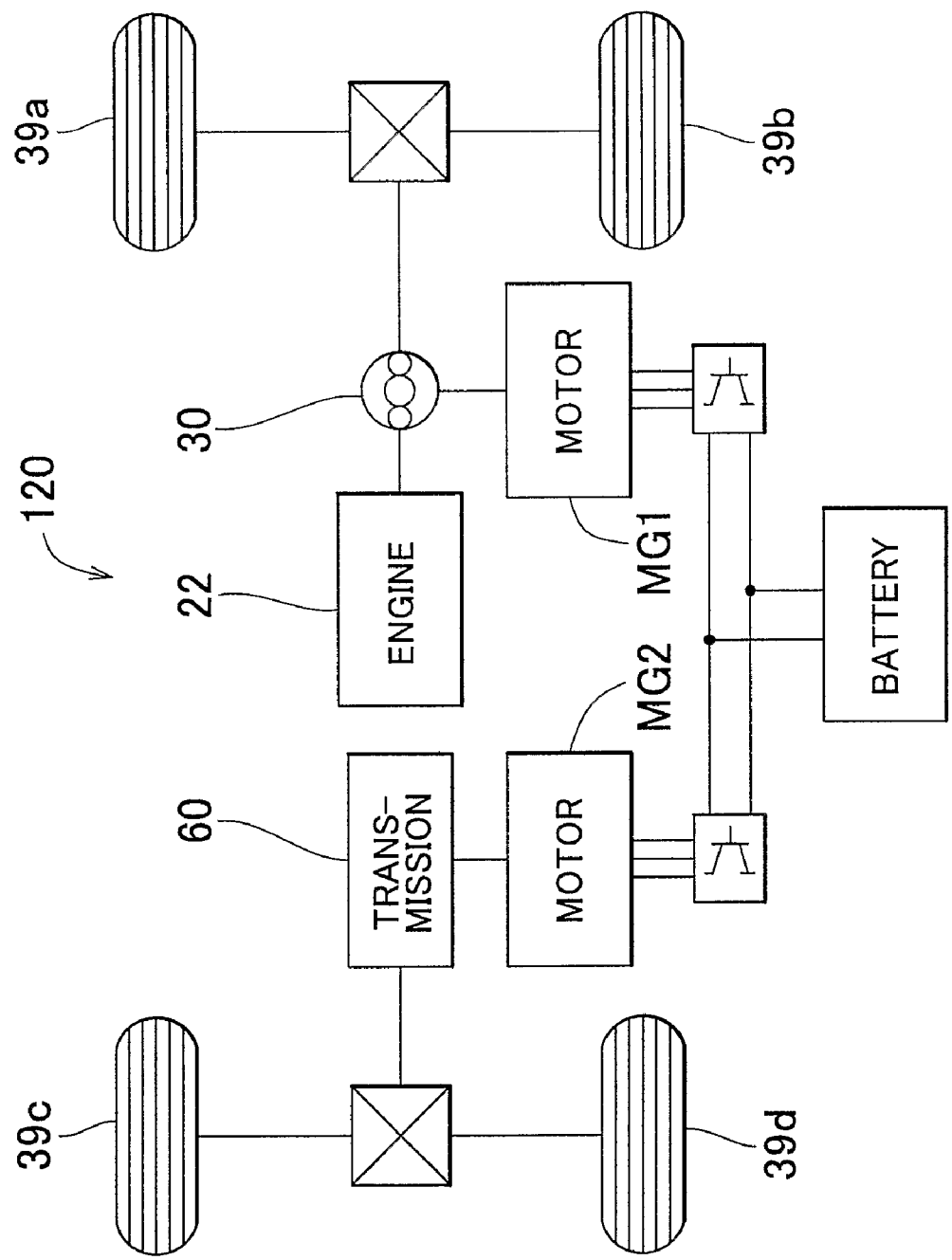
FIG. 10 is the block diagram schematically showing the configuration of a hybrid vehicle 120 according to a modified example.

In the hybrid vehicle 20 of the example embodiment, the transmission ratio between the rotating shaft of the motor MG2 and the ring gear shaft 32a is changed by the transmission 60 and the power is output to the ring gear shaft 32a which serves as the drive shaft. However, as illustrated with a hybrid vehicle 120 according to a modified example shown in FIG. 10, the transmission ratio between the rotating shaft of the motor MG2 and the ring gear shaft 32a may be changed by the transmission 60 and the power may be output to an axle (i.e., an axle that is connected to the drive wheels 39c and 39d in FIG. 10) that is different from the axle to which the ring gear shaft 32a is connected (i.e., the axle that is connected to the drive wheels 39a and 39b).

Figure 11:
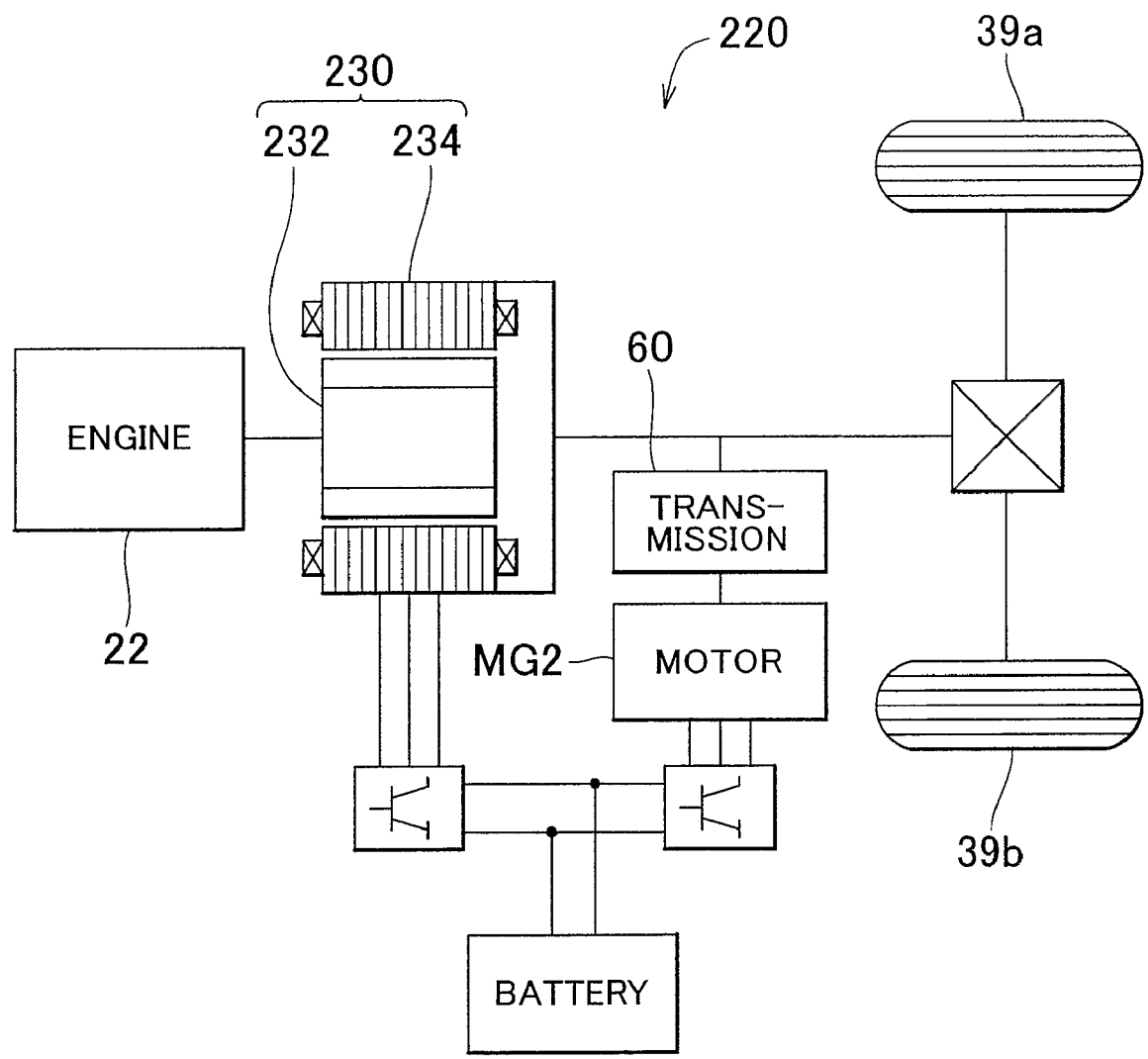
FIG. 11 is the block diagram schematically showing the configuration of a hybrid vehicle 220 according to another modified example.

In the hybrid vehicle 20 of the example embodiment, power from the engine 22 is output via the power split/integration mechanism 30 to the ring gear shaft 32a, serving as the drive shaft, that is connected to the drive wheels 39a and 39b. However, as illustrated with a hybrid vehicle 220 according to a modified example shown in FIG. 11, a dual-rotor motor 230 may also be provided which has an inner rotor 232 connected to the crankshaft 26 of the engine 22 and an outer rotor 234 connected to a drive shaft which outputs power to the drive wheels 39a and 39b. The dual-rotor motor 230 transmits some of the power from the engine 22 to the drive shaft, and converts surplus power into electric power.

In the example embodiments, a vehicle is described in which the engine 22 and the motor MG1 are connected to the drive shaft via the power split/integration mechanism 30 and the motor MG2 is connected to the drive shaft via the transmission 60. The invention is not limited to this configuration, however, as long as a power source is provided, in addition to the motor MG2, that is capable of outputting power to the drive shaft. Also, instead of the mode being a vehicle provided with the engine 22, the power split/integration mechanism 30, and the motors MG1 and MG2, the mode may be a power output system, or a drive system that does not include the engine 22 and that outputs power from the motor MG2 to the drive shaft via the transmission 60. When the mode is a power output system or a drive system, it may be mounted in a vehicle other than an automobile, an airplane, a marine vessel, or the like.

While the invention has been described with reference to example embodiments thereof, it is to be understood that the invention is not limited to those example embodiments or constructions. To the contrary, the invention may be embodied in various other specific forms without departing from the spirit thereof.

The invention claimed is:

1. A drive system that drives a drive shaft, comprising:
   a motor that outputs power;
   a shifting/transmitting device that transmits power from a rotating shaft of the motor to the drive shaft, and changes a transmission ratio between the rotating shaft of the motor and the drive shaft by driving an actuator;
   a shift learning device that performs a learning operation to learn at least one of an operational state of the actuator and an operational state of the motor, when the transmission ratio of the shifting/transmitting device is changed such that an amount of change in driving force on the drive shaft side, that is output to the drive shaft from the motor via the shifting/transmitting device, is within a predetermined range; and
   a shift control device that controls the actuator of the shifting/transmitting device using results of the learning operation such that the transmission ratio of the shifting/transmitting device changes.

2. The drive system according to claim 1, wherein the shift learning device estimates the driving force on the drive shaft side based on driving of the motor, and perform the learning operation when the transmission ratio of the shifting/transmitting device is changed such that the amount of change in the estimated driving force on the drive shaft side is within the predetermined range.

3. The drive system according to claim 2, wherein the shift learning device estimates the driving force on the drive shaft side using one of a current value applied to the motor and a torque command value of the motor.

4. The drive system according to claim 1, wherein the shift learning device performs the learning operation when a difference between the driving force on the drive shaft side at an onset of the change in the transmission ratio of the shifting/transmitting device and the driving force on the drive shaft side during the change in the transmission ratio of the shifting/transmitting device is less than a predetermined difference until the change in the transmission ratio of the shifting/transmitting device ends.

5. The drive system according to claim 1, wherein:
   the shifting/transmitting device changes the transmission ratio by changing an application state of at least one hydraulically driven clutch; and
   the shift learning device learns the application state of the clutch of the shifting/transmitting device and a state of hydraulic pressure supplied to the clutch throughout a duration of the change in the transmission ratio of the shifting/transmitting device.

6. The drive system according to claim 1, wherein the shift learning device learns a change state of a rotation speed of the motor throughout the duration of the change in the transmission ratio of the shifting/transmitting device.

7. A power output system comprising:
   the drive system according to claim 1;
   a power device that outputs power to the drive shaft;
   a required power setting device that sets a required power that is required for the drive shaft; and a control device that controls the motor and the power device such that the required power that is set by the required power setting device is output to the drive shaft based on the transmission ratio of the shifting/transmitting device.

8. The power output system according to claim 7, wherein the power device includes an internal combustion engine and an electric power/power input/output device, the electric power/power input/output device being connected to an output shaft of the internal combustion engine and the drive shaft, and the electric power/power input/output device outputting at least some of power from the internal combustion engine to the drive shaft.

9. The power output system according to claim 8, wherein the electric power/power input/output device comprises a power split/integration mechanism and the motor.

10. A vehicle equipped with the power output system according to claim 7, wherein an axle is connected to the drive shaft.

11. A method for controlling a drive system including a motor that outputs power and a shifting/transmitting device that transmits power from a rotating shaft of the motor to the drive shaft, and changes a transmission ratio between the rotating shaft of the motor and the drive shaft by driving an actuator, comprising:

(a) performing a learning operation to learn at least one of an operational state of the actuator and an operational state of the motor, when the transmission ratio of the shifting/transmitting device is changed such that an amount of change in driving force on the drive shaft side, that is output to the drive shaft from the motor via the shifting/transmitting device, is within a predetermined range; and (b) controlling the actuator of the shifting/transmitting device using results of the learning operation such that the transmission ratio of the shifting/transmitting device changes.

* * * * *